United States Patent
Crosse

[19]

[11] Patent Number: 6,065,429
[45] Date of Patent: May 23, 2000

[54] DISPOSABLE CAT LITTER BOX WASTE RECEPTACLE ASSEMBLY WITH ENCLOSURE

[76] Inventor: Douglas C. Crosse, 159 Stonebrook St., Simi Valley, Calif. 93065

[21] Appl. No.: 09/211,830

[22] Filed: Dec. 15, 1998

[51] Int. Cl.$^7$ .................................................. A01K 29/00
[52] U.S. Cl. ............................................................. 119/165
[58] Field of Search ..................................... 119/165, 168

[56] References Cited

U.S. PATENT DOCUMENTS

| 4,800,842 | 1/1989 | Jones, Jr. | 119/168 |
| 4,919,078 | 4/1990 | Morrison | 119/168 |
| 5,178,100 | 1/1993 | Monk | 119/168 |
| 5,251,573 | 10/1993 | Bremley | 119/168 |
| 5,765,504 | 6/1998 | Evans et al. | 119/168 |

*Primary Examiner*—Thomas Price
*Attorney, Agent, or Firm*—Robert Louis Finkel

[57] ABSTRACT

An improved disposable, cat litter box waste receptacle assembly with enclosure having a box tray (10) which in its use configuration accepts and holds a litter latrine (14). A latrine privacy enclosure cover (12) that has a cut out removable entry (16) is placed in the box tray (10) and over the litter latrine (14). The entire box assembly is made of recyclable paper products. Its interior surfaces are moisture resistant. In its shipping-inverted configuration the box assembly utilizes the box tray (10) as a top. The latrine privacy enclosure cover (12) functions as a shipping and transport container which houses a supply of litter latrines (14) each of which contain a quantity of absorbent litter (24). The assembly includes a carrying handle (18) and a closure device (20) which secure the assembly and its contents while in transport. The assembly includes all of the supplies required for its intended use.

10 Claims, 5 Drawing Sheets

DISPOSABLE CAT LITTER BOX WASTE RECEPTACLE ASSEMBLY WITH ENCLOSURE

BACKGROUND—FIELD OF INVENTION

This invention is a disposable cat litter box waste receptacle assembly, with enclosure, constructed primarily from recycled materials, and which includes a quantity of disposable litter latrines pre-filled with a quantity of absorbent litter.

BACKGROUND—DESCRIPTION OF PRIOR ART

The inconvenience, cost and effort of maintaining a cat litter box is of concern to many owners, witness the number of patented and trademarked devices which are designed to address the tasks. Also of concern to present day humankind is the reality that recycling and composting have become a necessity in order to protect and preserve the environment. Cat litter waste receptacles have conventionally been composed of plastic or polyinal and require the addition of absorbent litter, usually clay based. In addition, repeated maintenance and cleaning is required after they are soiled by waste before re-use. They conventionally have not been designed to be disposed of, recycled or composted.

Several inventors have created cat litter boxes which address one or more concerns; but fall short of solving several. U.S. Pat. No. 4,779,567 to Smith (1987) discloses a disposable travel type pet litter box; however, it is a single use device which must be maintained by cleaning and refilled with litter in order to be reused. It requires the use of a disposable bag liner, and does not provide a dome or enclosure for an animal to enter for privacy, tidiness and odor control.

U.S. Pat. No. 4,732,111 Runion (1987) shows a unit which includes a disposable insert tray. Although this device is re-usable and disposable; it requires refilling with a conventional litter material, cleaning and maintenance for repeated use. The disposable tray is of such construction that it would require a separate moisture proof liner for extended and repeated use in order to prevent waste soilage. Waste must be removed between litter refilling for extended use.

U.S. Pat. No. 5,060,849 to King (1990) is a dual purpose-home and transportable disposable device. However, it to is limited to single use. U.S. Pat. Nos. 5,048,465 & 5,477,812 (1990–91) to Windmere is a self cleaning electromechanical litter box, constructed of sturdy polyvinal plastic, and metal, and requires a motor, power, a specially designed refuse collection bag, maintenance and refilling with clumping litter exclusively. This device is complex, costly and not intended to be recyclable or disposable.

Other inventions in this field range from simple plastic trays, to disposable single use cardboard travel boxes, to prepackaged disposable single use units which incorporate a plastic tray filled with high quality anti-bacterial clay litter, such as the Johnny Cat Toss Away™ First Brands Corporation, USA.

There are a multitude of innovative cat litter waste receptacles, and several clever waste removal, cleaning and sifting devices or systems. Such as the Self Cleaning Cat Box™ Roll To Clean Co., Canada. The polyvinal Sifting Cat Pan™ Van Ness Plastics, USA. A Hooded Cat Box with air filter™ Doskocil Corp, USA. All of which that were herein disclosed have inherent limitations. They are of a permanent not disposable or recyclable nature, require specially designed clay litter and bag liners, are costly, not ecologically conscious in design, require separate maintenance operations to remove waste, refill litter, and clean between soilings for extended use, require separate packaging and supplies. Although innovative and convenient, all cat litter waste receptacle devices heretofore known suffer from one or more common disadvantages:

(a) The use of primarily polyvinal plastic construction results in a permanent rather than disposable, recyclable, or compostable product.
(b) Plastic products are expensive to manufacture.
(c) Recycling polyvinal is a complex and costly process.
(d) Plastic is not generally considered to be compostable or biodegradable.
(e) Many existing litter waste devices require special auxiliary supplies for use. Such as a particular type of litter, bags or liners, air filters, and even batteries or power supplies.
(f) Prior devices and systems are often costly, complex difficult to use, and inconvenient to clean and maintain.
(g) The common exclusion of a latrine privacy enclosure on many allows the soiled litter to be spread about during and after use. Lack of such an enclosure allows excessive odors to escape and is not attractive to cats. Felines tend to be attracted to and like to enter boxes or enclosures.
(h) Clay litter is a physically heavy material to transport and ship.
(i) Clay litter is not a recycled or recyclable product.
(j) Existing devices often require external packaging which unnecessarily increase the cost of manufacture and requires separate disposal of said packaging.
(k) Many units are intended for single use and must be disposed of once soiled.
(l) Most designs for permanent type litter waste recepticles require ongoing separate cleaning, refilling and maintenance operations to be performed.
(m) Of the single use disposable units, many of which are constructed of cardboard like materials, most of this type require auxiliary supplies and are not moisture or odor resistant. Those not made of cardboard tend to be disposable; but not recyclable or compostable.

OBJECTS AND ADVANTAGES

Accordingly, several objects and advantages of my invention are:

(a) to provide a cat litter box waste receptacle assembly with enclosure that is disposable, recyclable, and compostable,
(b) to provide a litter box not constructed of plastic or metal; but primarily from paper based materials,
(c) to provide a litter box that is cost effective to recycle,
(d) to provide a litter box that is a complete assembly, not requiring auxiliary supplies for use,
(e) to provide a litter box of simple design that is inexpensive, is convenient to use, and easy to maintain,
(f) to provide a litter box that includes a latrine privacy enclosure for tidiness, odor control, and which is attractive to cats,
(g) to provide a litter box assembly that includes a supply of light weight absorbent litter material for convenience of use, easy and cost effective shipping and transport,
(h) to provide a litter box that includes a supply of litter that is a recyclable, and compostable product, (i) to provide a litter box that includes a supply of litter that is packaged in a quantity of sealed moisture resistant litter latrine trays, (j) to provide a litter box wherein the packaging is also the product, (k) to provide a litter box which is designed for extended use; but does not require the removal of waste, refilling of litter, or cleaning as a separate operation of maintenance, (l) to provide a litter box made of primarily paper based materials which is complete for use with all necessary supplies, is designed for extended us, and is moisture and odor resistant.

Further objects and advantages are:

(m) to provide a litter box that is not offensive to clean and maintain, (n) to provide a litter box that is convenient to use, (o) to provide a litter box that is environmentally friendly, (p) to provide a litterbox that is affordable.

Still further objects and advantages will become apparent from a consideration of the ensuing description and drawings.

Figure 1:
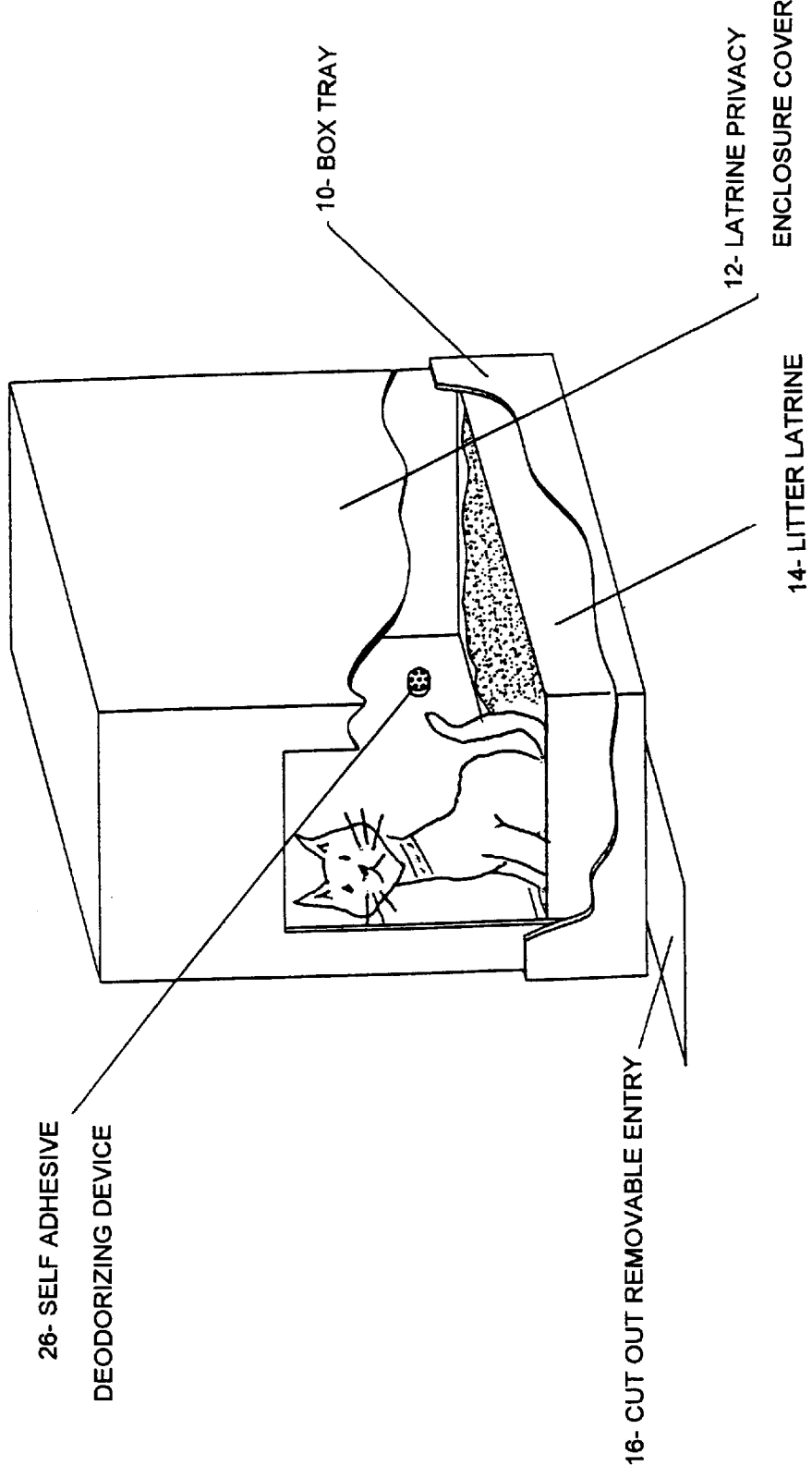
FIG. 1 is a perspective view of my litter box assembly invention positioned in its use configuration., that is exploded with cross section.

REFERENCE NUMERALS 10 box tray
12 latrine privacy enclosure cover
14 litter latrine
16 cut out removable entry
18 carrying handle
20 closure device
22 latrine seal sheet
24 prepackaged absorbant litter
26 self adheasive deoderizing device

SUMMARY

This invention is a disposable, cat litter box waste receptacle assembly with enclosure. The assembly includes a bottom box tray which holds a litter latrine that is supplied with a quantity of absorbent litter. The enclosure has a cut out removable entry, and fits over the litter latrine and in the tray. The assembly is made of recyclable materials. It is configured in such a way that the assembly is also the packaging for shipping and transport and includes the necessary supplies for its intended use.

PREFERRED EMBODIMENT—DESCRIPTION
FIGS. 1 to 5

A typical embodiment of the present litter box assembly invention is illustrated in FIG. 1, a perspective view of the litter box assembled in its use configuration. In the preferred embodiment the box has a box tray 10 made of a paper product or byproduct such as corrugated or chipboard, which have interior moisture resistant surfaces. However; said tray can consist of any other material that can be readily recycled, such as various laminated or extruded materials, fibrous materials, cloth, wood products or byproducts, leather, metal, recyclable polyvinal or plastic, etc. A latrine privacy enclosure cover 12 is similarly constructed as is the box tray 10. A prepackaged litter latrine 14 with litter, is shown in place for use. A cut out removable entry 16 is shown in place functioning as an optional cat paw cleaning device. A self adhesive deodorizing device 26 is shown in place.

In the preferred embodiment the assembled box FIG. 1 has approximately parallel surfaces; the opposing top, sides and bottom form a shape approximating a rectangular shaped cube. However; other shapes such as oblong, round or rounded, or angular could be used.

Figure 2:
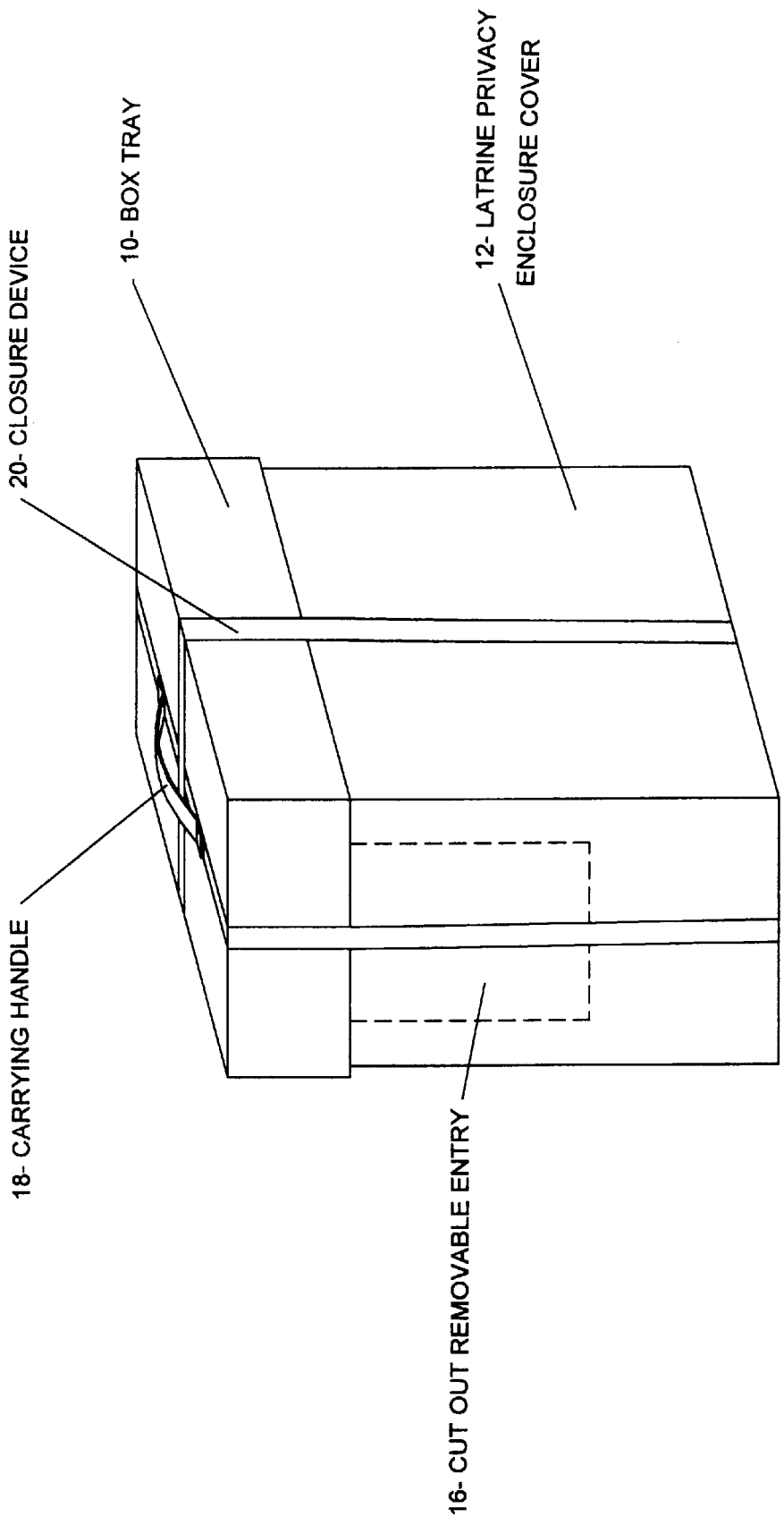
FIG. 2 is a perspective view of my litter box in its inverted- shipping configuration.

FIG. 2 represents a perspective view of the box in its assembled for transport or shipping/inverted configuration. In this position, the bottom tray 10 acts as a top. The enclosure 12 acts as a receptacle and shipping- transport container. A cut out removable entry 16a opening is shown in place, a carrying handle 18, and a closure device 20 or means for securing the assembly in a closed condition during shipping are represented.

Figure 3:
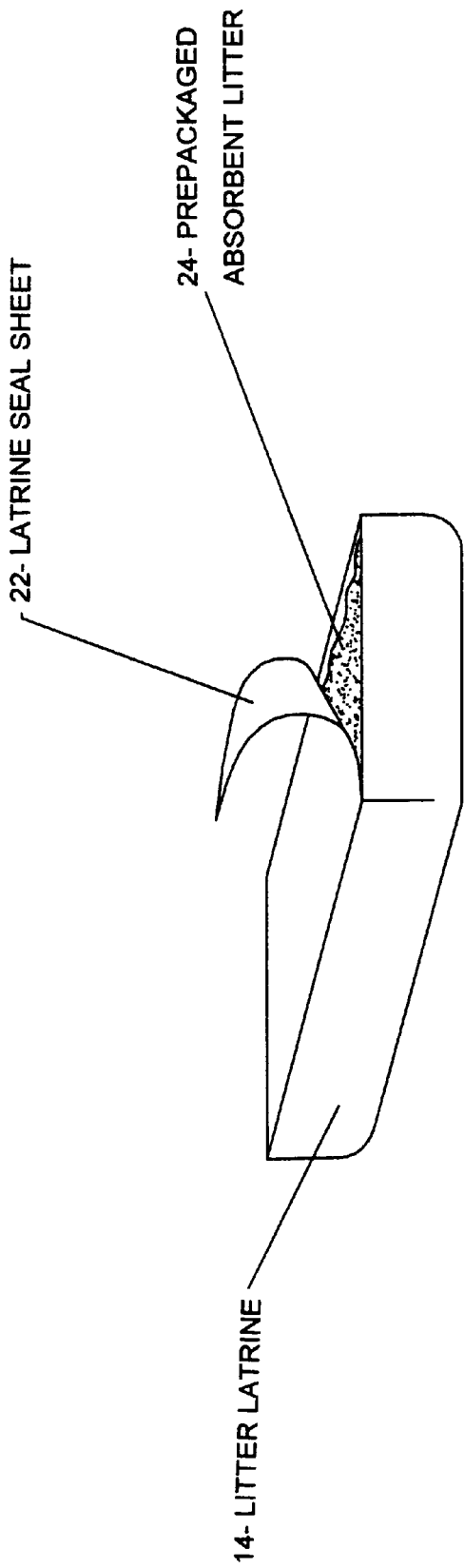
FIG. 3 is a perspective view of the litter latrine assembly

FIG. 3 is an expanded perspective view of the litter latrine 12. Said latrine is similarly constructed as tray 10 and enclosure 12, with its interior surface being moisture resistant. A removable latrine seal sheet 22 keeps the prepackaged absorbent litter 24 in place during shipping, transport and storage.

Figure 4:
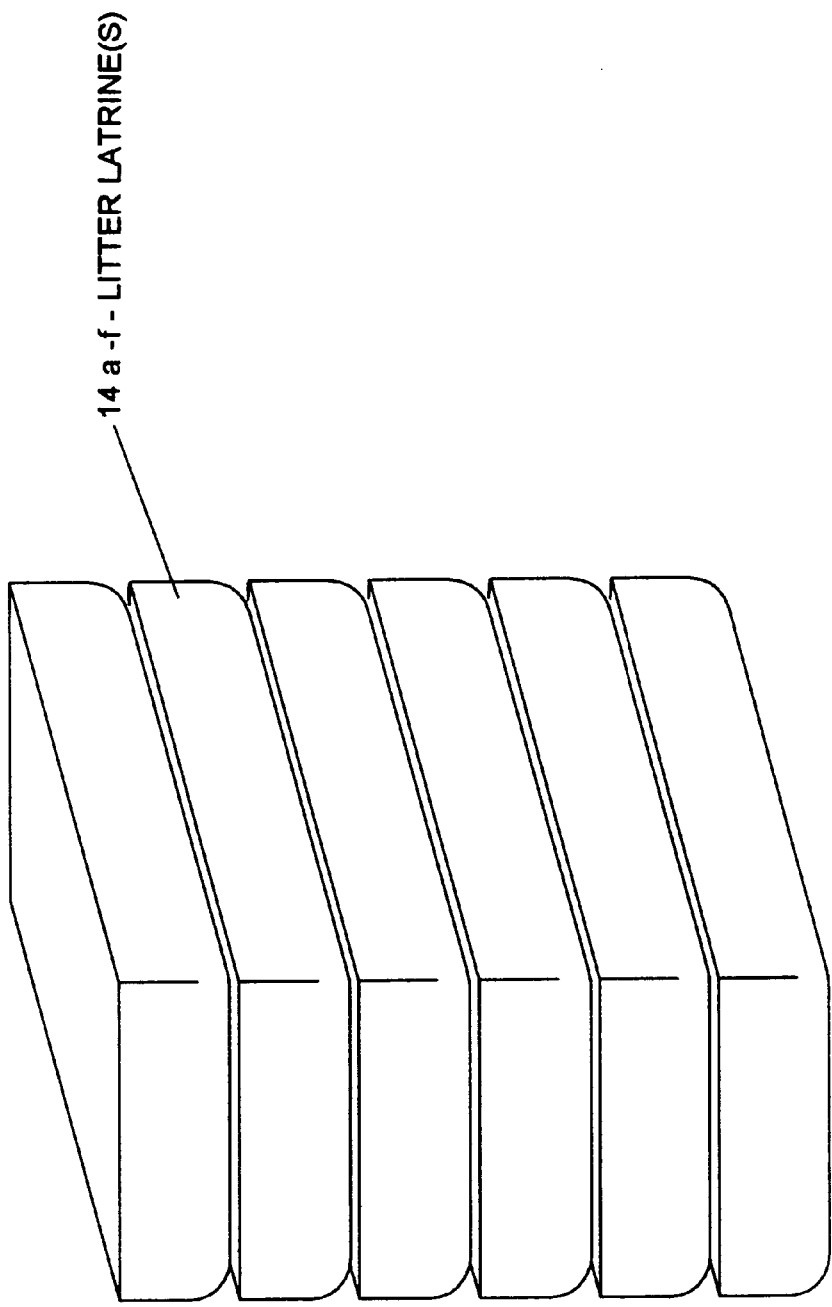
FIG. 4 is a perspective view of the litter latrine assembly in shipping configuration.
Figure 5:
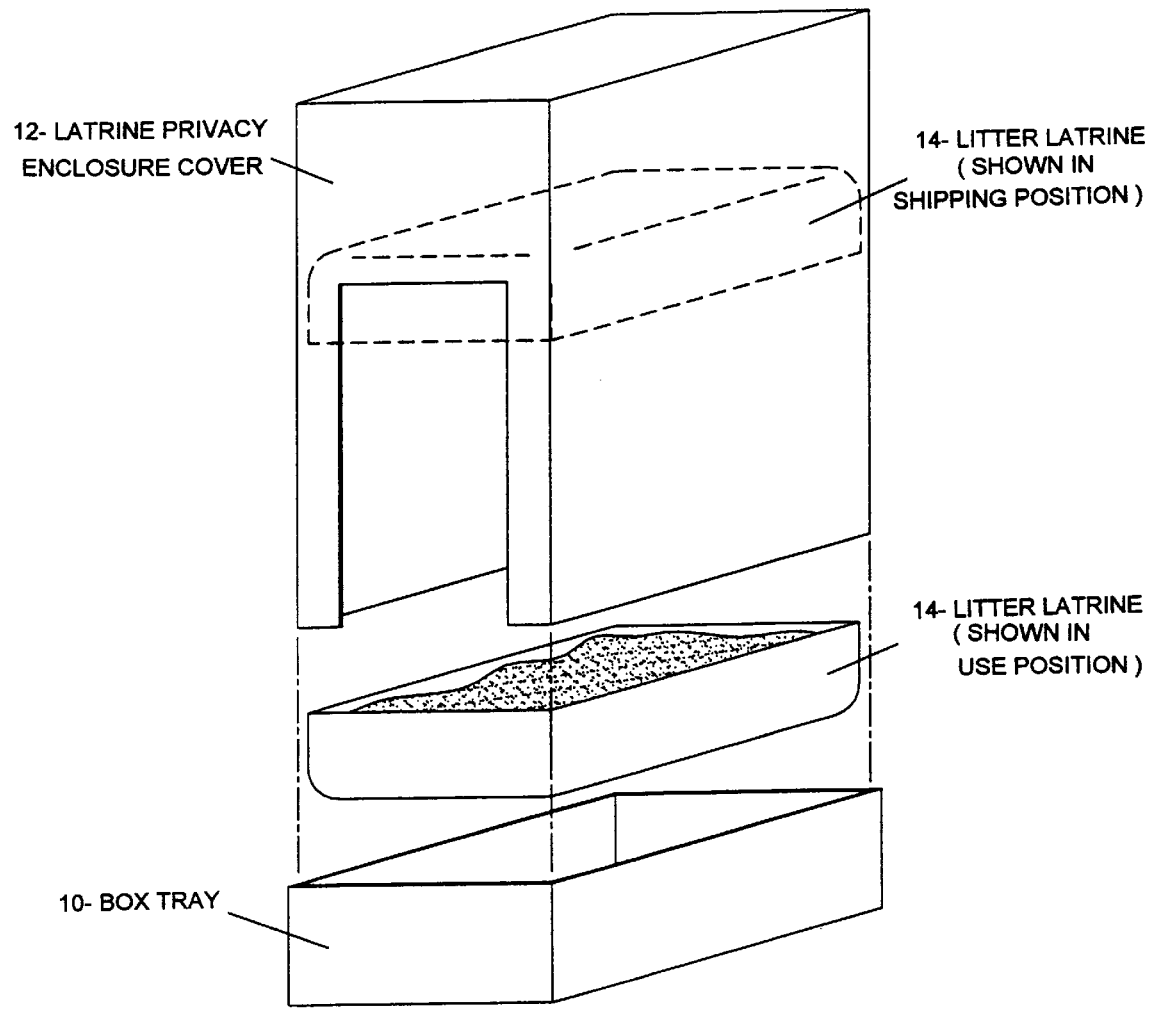
FIG. 5 is a perspective view of the litter box assembly in its use position, that is exploded with cross section.

FIG. 4 is a perspective representation of the litter latrine assembly 14 a–f stacked for shipping. FIG. 5 shows a perspective exploded view with cross section of the box assembly with the litter latrine 14 in both its shipping and use position.

In the preferred embodiment the entire box assembly, FIGS. 1–2–3–4–5 is constructed of paper products or by-products. However; the entire assembly could be constructed from any other material that can be readily recycled, such as various laminated or extruded fibrous material, cloth, wood products or by-products, leather, metal, recyclable polyvinal or plastic, etc.

PREFERRED EMBODIMENT—OPERATION
FIGS. 1–2–3–4–5

The manner of using the box assembly is to open it by removing the box tray 10 as shown in FIG. 2. Then the user takes out the litter latrines 14 a–f shown in FIG. 4. One latrine 14 is opened to expose the prepackaged absorbent litter 24, contained inside by removing a latrine seal sheet 22 shown in FIG. 3. The user then inverts tray 10 FIG. 1, inserts the opened latrine 14. The assembly is completed by removing the cut out 16 from a latrine privacy enclosure cover 12 and placing said cut out in front of the box tray, then placing the enclosure 12 over the tray 10 and latrine 14 as shown in FIG. 1.

To remove and dispose of the soiled latrine 14 FIG. 1, the enclosure 12 is removed and the entire latrine 14 is removed for disposal, recycling, or composting. A replacement latrine 14 is then opened and inserted as previously described. The enclosure 12 is then replaced. Upon exhaustion of unused latrines 14 a–f FIG. 4, the entire box assembly is disposed of, recycled, composted, and replaced with new.

CONCLUSIONS, RAMIFICATIONS, AND SCOPE

Accordingly, it can be seen that the configuration and composition of this litter box assembly can be used to easily, conveniently, and economically to address the often unpleasant task of cat litter box waste removal and maintenance, in an ecologically friendly manner by a person of most any age.

The invention has additional advantages in that;

It is easily transported, stored and shipped.

It is lightweight for cost effective shipping.

While the description above contains many specificities, these should not be construed as limiting the scope of the invention; but as merely providing illustrations of some of the presently preferred embodiments of this invention or as an exemplification of one embodiment. Other embodiments and ramifications are possible within it's scope. For example, variations of size, color, printing and additional packaging.

Additional variations possible include construction materials, quantities and physical qualities, such as; shape, size, weight, strength or test, relationship or orientation of parts, specifications, absorbency or moisture resistance.

Accordingly, the scope of the invention should be determined by the appended claims and their legal equivalents, rather than by the examples given or embodiments illustrated.

What is claimed is:

1. A disposable cat litter box waste receptacle assembly with enclosure, comprising in combination:

a unitary upstanding open top rectangular box tray having a bottom wall continuous with contiguous first and second opposed side walls and third and fourth opposed end walls, said box tray being of a predetermined size sufficient to accommodate a house cat and dimensioned to fit closely adjacent to and approximately parallel while overlap the side and end walls of an open bottom rectangular enclosure positioned therein;

said open bottom rectangular enclosure having a top wall contiguous with contiguous opposed side walls and opposed end walls, and a cut out removable entry of sufficient size for entry by a house cat on one of the end walls;

a plurality of rectangular moisture resistant open top litter latrine assemblies each having a bottom wall, a pair of opposed side walls, and a pair of opposed end walls, and dimensioned to fit approximately adjacent to and parallel within the side and end walls of said open bottom enclosure, each of said latrine assemblies having as its contents a quantity of absorbent litter, said litter being held in place by, a removable top sealing sheet, whereby, the litter latrine assembly is self contained for use and disposal as a unit after its contents are soiled by waste; and retaining means for securing said box waste receptacle assembly in a closed condition during shipping, storage, and transport; and a handle mounted to, and positioned at the top of the enclosure to facilitate carrying the assembly.

2. The disposable cat litter box waste receptacle assembly of claim 1, wherein said handle can be repositioned.

3. The disposable cat litter box waste receptacle assembly of claim 1, wherein said retainer comprises a strap adapted to encircle said enclosure and said cap.

4. The disposable cat litter box waste receptacle assembly of claim 3, wherein said strap is adapted for reattachment to the assembly to facilitate carrying and disposing of said assembly or its contents.

5. The disposable cat litter box waste receptacle assembly of claim 4, wherein said handle is incorporated in said strap.

6. A disposable cat litter box waste receptacle assembly with enclosure, comprising in combination:

a unitary upstanding rectangular enclosure having a pair of opposed end walls, a pair of opposed side walls contiguous with the end walls, a bottom wall contiguous with the end and side walls, and an open top, one of said end walls having a cut-out removable entry of a predetermined size sufficient to allow passage of a house cat into and out of said enclosure, and said enclosure being of a predetermined size sufficient to accommodate a house cat entering, defecating within, and exiting said enclosure;

a unitary rectangular cap having a pair of opposed upstanding end walls, a pair of opposed upstanding side walls contiguous with the end walls, a top wall contiguous with the end and side walls, and an open bottom, the end and side walls of said cap being dimensioned for snugly overlapping and frictionally retaining the end and side walls of said enclosure adjacent the open bottom of said enclosure, whereby said cap serves as a removable closure for said enclosure;

a plurality of rectangular, moisture resistant, removable-top, absorbent litter-containing latrines dimensioned for stacked insertion into said enclosure;

a releasable retainer for securing said cap to said enclosure during storage and transport of the assembly, said cap upon release of said retainer being removable from said enclosure for access to and removal of the litter-containing latrines and upon inversion of said enclosure serving as a box tray for receiving and retaining one or more of the latrines within said enclosure; and a handle mounted to, and positioned above said enclosure for carrying said assembly.

7. The disposable cat litter box waste receptacle assembly of claim 6, wherein said retainer comprises a strap adapted for encircling said enclosure and said cap.

8. The disposable cat litter box waste receptacle assembly of claim 7, wherein said strap is adapted for reattachment to the assembly to facilitate carrying and disposing of said assembly or its contents.

9. The disposable cat litter box waste receptacle assembly of claim 8, wherein said enclosure is sized for snug engagement of the litter-containing latrines.

10. The disposable cat litter box waste receptacle assembly of claim 6, wherein the cutout removable entry has an abrasive interior surface which, with the cutout removed from the enclosure and positioned adjacent the entry, serves to clean litter and waste from the paws of a cat exiting the enclosure.

* * * * *